United States Patent

Shibuya

[11] Patent Number: 5,199,399
[45] Date of Patent: Apr. 6, 1993

[54] SYSTEM AND METHOD FOR CONTROLLING IDLING SPEED FOR INTERNAL COMBUSTION ENGINE LINKED TO BELT TYPE ELECTRO-CONTINUOUSLY VARIABLE TRANSMISSION

[75] Inventor: Toru Shibuya, Yokohama, Japan
[73] Assignee: Nissan Motor Co., Ltd., Yokohama, Japan
[21] Appl. No.: 888,757
[22] Filed: May 27, 1992
[30] Foreign Application Priority Data
  May 30, 1991 [JP] Japan .................. 3-126425
[51] Int. Cl.$^5$ .............................. F02D 41/08
[52] U.S. Cl. ................... 123/339; 74/857; 123/423
[58] Field of Search ............. 123/339, 418, 419, 423; 74/857

[56] References Cited

U.S. PATENT DOCUMENTS

| | | | |
|---|---|---|---|
| 3,554,173 | 1/1971 | Masaki et al. | 123/339 X |
| 4,598,611 | 7/1986 | Frank | 123/339 X |
| 4,612,892 | 9/1986 | Iwanaga et al. | 123/339 X |
| 4,700,674 | 10/1987 | Iwata | 123/339 X |

FOREIGN PATENT DOCUMENTS 63-38747 2/1988 Japan .
2-89852 3/1990 Japan .
3-239862 10/1991 Japan .

OTHER PUBLICATIONS

Japanese Service Manual "ECVT-TB40 Type Construction Operation System Configuration", Mar. 1990.

*Primary Examiner*—Tony M. Argenbright
*Attorney, Agent, or Firm*—Foley & Lardner

[57] ABSTRACT

A system and method for controlling an engine idling speed for an internal combustion engine associated with an electro-continuously variable transmission are disclosed in which when an accelerator pedal is released to carry out an abrupt deceleration of the vehicle during the vehicle run with the transmission gear ratio in a second, third, or overdrive range, an engine fuel is instantaneously supplied in an asynchronous fuel injection mode so that the engine idling speed is temporarily increased and an oil pump revolution speed for changing the gear ratio is increased.

10 Claims, 4 Drawing Sheets

SYSTEM AND METHOD FOR CONTROLLING IDLING SPEED FOR INTERNAL COMBUSTION ENGINE LINKED TO BELT TYPE ELECTRO-CONTINUOUSLY VARIABLE TRANSMISSION

BACKGROUND OF THE INVENTION

1. Field of The Invention

The present invention relates to a system and method for controlling an idling speed for an internal combustion engine linked to, for example, a steel belt type electro-continuously variable transmission.

2. Description of The Background Art

A Japanese Patent Application First Publication Showa 63-38747 published on Feb. 19, 1988 exemplifies a steel belt type electro-continuously variable transmission (non-stage power transmission, or abbreviated as ECVT) for an automotive vehicle.

In the electro-continuously variable transmission, a so-called torque converter which transmits output power of an associated engine to its output shaft via a fluid is installed and, in addition to this, a steel belt is wound around two pulleys so as to provide the transmission means for transmitting the output power of the engine to the output shaft.

In detail, the continuously variable transmission includes: an electromagnetic clutch mechanism for starting the vehicle which intermittently connects or disconnects a crankshaft of the engine to an input shaft thereof; a synchro-mesh type forward/rearward switching mechanism; the steel belt wround around a primary pulley linked to the forward/rearward switching mechanism and a secondary pulley; a hydraulic pressure control valve mechacism which controls a hydraulic pressure in each pulley pressurized and supplied from an oil pump; and final gear ratio mechanism.

The oil pump is constituted by an outer tooth type involute gear pump directly driven by means of the engine crankshaft. Its drawn pressure is supplied to the primary pulley and secondary pulley via a hydraulic pressure control valve mechanism so as to be used as a working pressure.

That is to say, the hydraulic pressure control valve mechanism serves to control a flow in and out of a line pressure to and from the primary pulley and secondary pulley, an accelerator pedal depression quantity and engine revolution speed as signal sources and position each movable sheep of the primary and secondary pulleys to control a pulley ratio (gear ratio).

When a vehicle driver depresses the accelerator pedal and the gear ratio is placed in a first speed range, a predetermine line pressure is introduced to the primary gear. At this time, it is defined as a gear ratio change start point. At the gear ratio change start point, from where of the engine revolution speeds (required engine revolution speed) the gear range shift position is started is determined according to the magnitide of the accelerator pedal depression. During a steady state driving, as the requested engine revolution speed is increased with the gradual increase in the depression displacement on the accelerator pedal, the transmission shifts up toward second gear range, third gear range, and so on. On the other hand, when the driver releases the accelerator pedal during an overdrive mode, the gear ratio is shfted down to the first gear along with the decrease in the requested engine revolution speed.

In the electro-continuously variable transmission described above, the gradual downshift is carried out as the gradual reduction in the engine revolution speed and the downshift to the first speed range at the time of a predetermined low speed engine revolution in a case where a normal braking operation is carried out during a steady state drive over 2-nd gear range or acceleration drive.

In a case, however, where an abrupt deceleration due to an abrupt braking operation is carried out, the engine revolution speed abruptly drops below 1,500 r.p.m. along with an interruption of the electromagnetic clutch mechanism. Therefore, since an revolution speed of the oil pump also abruptly drops accordingly, the drawn pressure required to change from third or second gear range to the first range cannot be maintained any more.

Consequently, even if the immediate acceleration is tried after the abrupt deceleration, the gear range is not yet placed in the first speed range. Then, a time lag occurs and acceleration feeling is remarkably reduced.

SUMMARY OF THE INVENTION

It is therefore a principal object of the present invention to provide a system and method for controlling an engine idling speed for an internal combustion engine linked to an electro-continuously variable transmission which can maintain the drawn pressure of the oil pump even when the abrupt deceleration of the vehicle occurs with the gear ratio range placed in the second or higher speed range.

The above-described object can be achieved by providing a system for controlling engine idling speed for an internal combustion engine associated with a belt type electro-continuously variable transmission, comprising: a) first means for detecting an engine idling state of the engine and outputting an engine idling state indicative signal; b) second means for detecting an engine revolution speed and outputting an engine revolution speed indicative signal according to the detected engine revolution speed; c) third means for comparing the engine revolution speed with a predetermined engine revolution speed so as to derive a rate of engine revolution speed reduction and output the rate of the engine revolution speed reduction indicative signal according to the result of comparison; d) fourth means for determining an abrupt deceleration of the engine when the engine falls in the engine idling state on the basis of the engine idling state indicative signal and the rate of engine revolution speed reduction indicative signal; and e) fifth means for exceptionally supplying an amount of fuel into respective engine combustion chambers when the fourth means determines the abrupt deceleration of the engine.

The above-described object can also be acheived by providing a method for controlling engine idling speed for an internal combustion engine associated with a belt type electro-continuously variable transmission comprising the steps of: a) detecting an engine idling state of the engine and outputting an engine idling state indicative signal; b) detecting an engine revolution speed and outputting an engine revolution speed indicative signal according to the detected engine revolution speed; c) comparing the engine revolution speed with a predetermined engine revolution speed so as to derive a rate of engine revolution speed reduction and output the rate of the engine revolution speed reduction indicative signal according to the result of comparison; d) determining an abrupt deceleration of the engine when the engine falls in the engine idling state on the basis of the engine idling state indicative signal and the rate of engine revolution speed reduction indicative signal; and e) exceptionally supplying an amount of fuel into respective engine combustion chambers when determining the abrupt deceleration of the engine.

DESCRIPTION OF THE PREFERRED EMBODIMENT

Reference will hereinafter be made to the drawings in order to facilitate a better understanding of the present invention.

Figure 1:
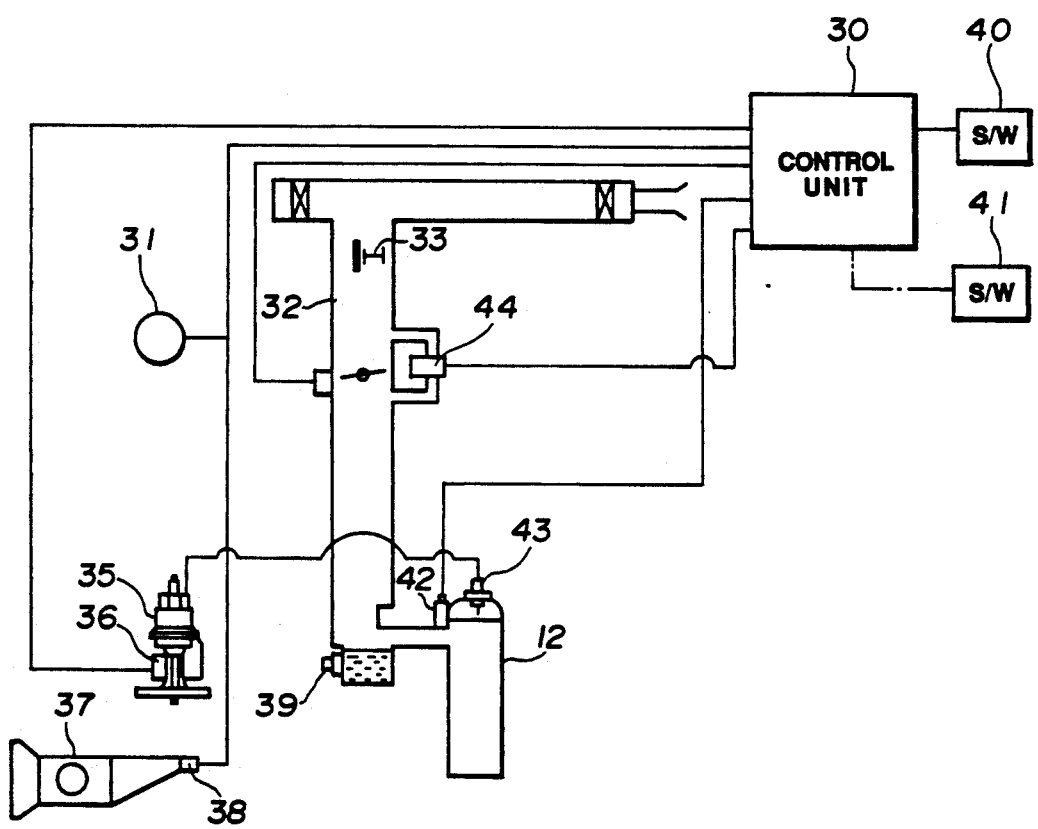
FIG. 1 is a system configuration of engine idling controlling system in a preferred embodiment according to the present invention applicable to an internal combustion engine linked to a steel belt type electro-continuously variable transmission (ECVT) according to the present invention.

FIG. 1 shows a preferred embodiment of an engine idling speed controlling system applicable to an internal combustion engine linked to a steel belt type electro-continuously variable transmission.

It is noted that the structures of various types of continuously variable power transmissions are exemplified by commonly-assigned U.S. patent application Ser. Nos. 07/739,761, 07/827,037, 07/829,151, and No. 07/829,471, the disclosures of which are herein incorporated by reference.

In FIG. 1, numeral 12 denotes an internal combustion engine to which an electro-continuously variable transmission 12 (hereinafter referred to as ECVT) is linked.

Figure 2:
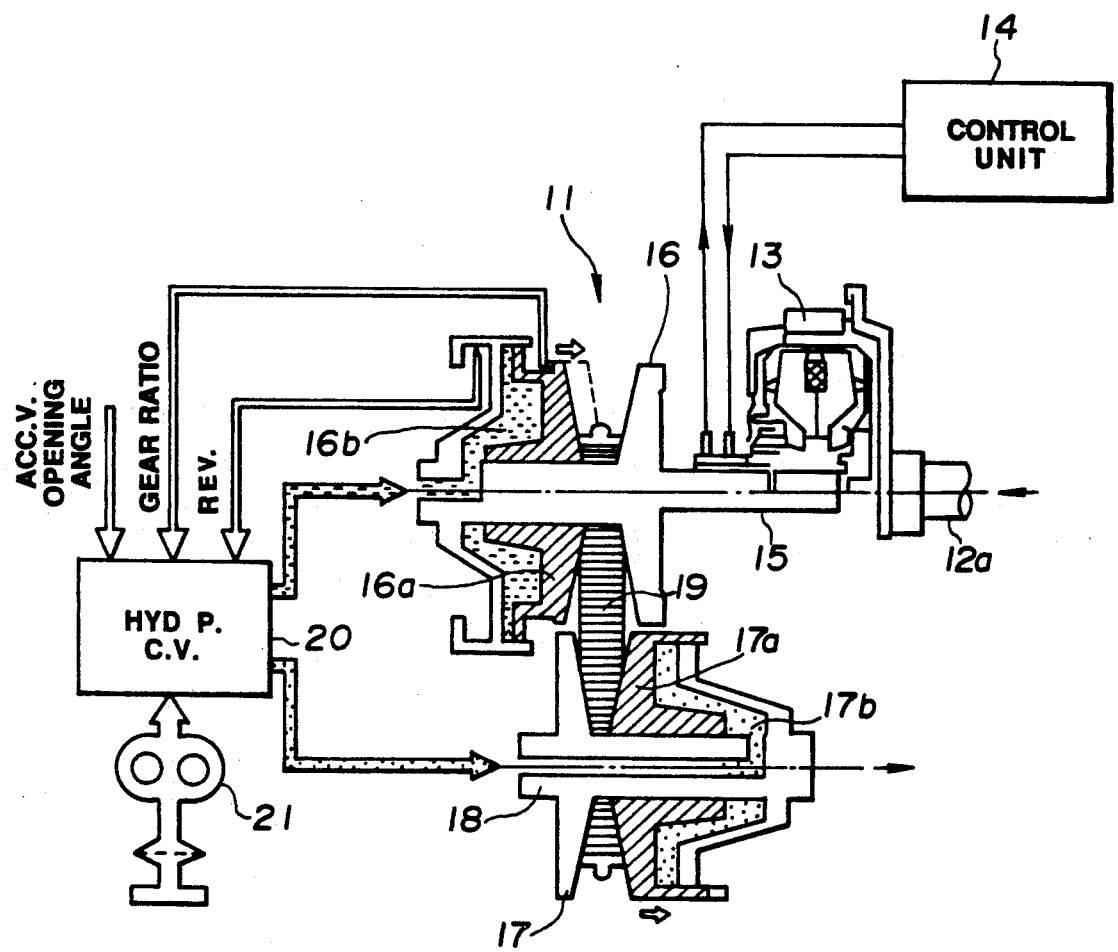
FIG. 2 is a rough sketch of a control system of the ECVT shown in FIG. 1.

FIG. 2 shows a rough sketch of the continuously variable transmission (ECVT 12) of a steel belt type.

In FIG. 2, the ECVT 12 includes: a self-contained control unit 14 exclusively used for control over the ECVT 12; an electromagnetic clutch 13 which connects or disconnects a driving power derived through an engine crankshaft 12a to or from an input shaft 15 in response to an ON-OFF signal derived from the control unit 14 according to an engine driving condition; a primary pulley 16 installed on the input shaft 15; a secondary pulley 17 installed on an output shaft 18 and which provides means for transmitting the driving power via a steel belt 19; and an oil pump 21 which supplies a drained hydraulic pressure derived therefrom to both primary and secondary pulleys 16 and 17 via a hydraulic pressure control valve mechanism 20.

The control unit 14 controls the electromagnetic clutch 13 so as to enable an optimum forward movement of the vehicle according to output signals from various sensors and switches such as associated engine revolution speed sensor, vehicle speed sensor, acceleration pedal depression sensor, brake pedal depression sensor, and a selector lever sensor.

Both primary and secondary pulleys 16, 17 are provided with movable sheaves 16a, 17a, respectively, the movable sheaves 16a, 17a being slided on their shafts by means of ball splines in response to the hydraulic pressure supplied to the oil pressure chambers 16b, 17b installed on side rear surfaces thereof so as to vary groove widths of the pulleys, respectively.

The hydraulic pressure control valve mechanism 20 includes: a pressure regulator valve which serves to supply an optimum hydraulic pressure to a hydraulic pressure chamber 17b of the secondary pulley 17 when the power transmission is carried out via the steel belt 19; shift control valves which control gear shift range continously from the first gear range to an overdrive range when the selector lever is placed in D range or Ds range; an engine braking valve which serves to maintain the engine revolution speed in a relatively high speed when the vehicle runs on a descending slope and requires the engine braking; and input signal system which detects a revolution speed of the input shaft 15, opening angle of an engine throttle valve, and gear shift ratio as control elements for the respective valves.

The oil pump 21 is constituted by an outer tooth mesh type involute gear pump directly driven from the crankshaft 12a of the engine, its drained oil being supplied via the pressure shift control valve to oil chambers 16b, 17b of the primary and secondary pulleys 16, 17.

The oil pump 21 also serves to control operations of such as electromagnetic clutch mechanism 13 and movable sheaves 16a, 17a of the respective pulleys 16, 17 according to the vehicle driving condition on the basis of control signals output from the control unit 14 after or before the engine cranking.

On the other hand, the engine idling speed controlling system of the internal combustion engine 12 is constituted as shown in FIG. 1.

A control unit 30 includes a microcomputer, i.e., a CPU, RAM, ROM, I/O unit, and common bus.

The control unit 30 receives its power supply when an ignition switch is turned on, receives an intake air quantity indicative signal from an airlow meter 33 installed in a midway through an intake air passage 32, signals indicating the opening angle of the engine throttle valve and presence or absence of the engine idling condition from an engine idling switch 34, receives an engine revolution indicative signal and engine ignition signal from a crank angle sensor 36 installed in an ignition pulse distributor 35, receives a neutral switch signal from the neutral switch 38 of the transmission 37 described above, receives an ON-OFF signal from an air conditioner switch 40, and receives an ON-OFF signal from an ABS (anti-lock brake system) switch 41 which detects an operation and/or inoperation of the anti-lock (anti-skid) control mechanism.

Furthermore, the control unit 30 detects the present engine driving condition on the basis of the switch signals and/or sensor signals input therein, calculates correction coefficients on a required fuel supply quantity and on an engine acceleration through a feedback control of an air/fuel mixture ratio to derive a final fuel injection quantity Ti, an output pulsewidth corresponding to the final fuel injection quantity and being supplied to a fuel injection valve 42 so as to achieve an optimum air/fuel mixture ratio according to the engine driving condition.

In addition, the control unit 30 carries out an ignition timing control for a plurality of ignition plugs 43 installed in respective engine cylinders via the distributor 35 and carries out the control over an auxiliary intake air quantity at the time of the engine idling, controlling an opening angle of an engine ilde control valve (AAC/V) 44.

It is noted that the control unit 30 serves to determine whether the engine falls in an abrupt deceleration state according to a relationship of the present engine revolution speed to a previously set engine revolution speed and required time duration and to control the pulsewidth supplied to the idle control valve 44 and fuel injection valve 42 in response to a determination signal derived as the result of determination of the abrupt deceleration described above so as to carry out the control for an incremental correction of the auxiliary intake air quantity and/or fuel injection quantity.

Figure 3:
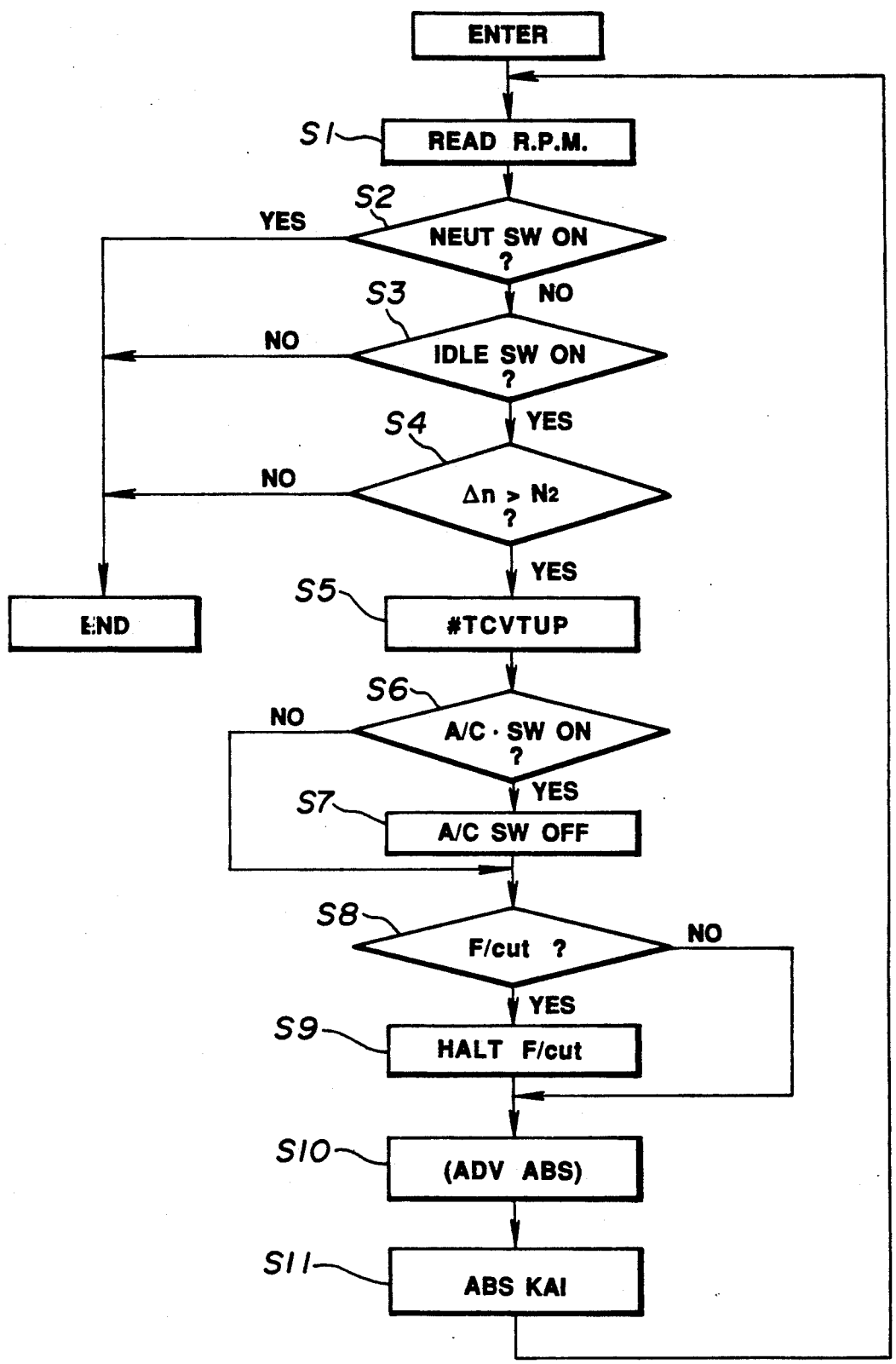
FIG. 3 is a control flowchart executed by a control unit shown in FIG. 1.

FIG. 3 shows a control flowchart executed by the control unit 30 in a case where the vehicular antilock control mechanism is not mounted in the vehicle.

In a step S1 of FIG. 3, the control unit 30 reads the present engine driving condition according to the output signals from such as the crank angle sensor 36 and so on.

In a step S2, the control unit 30 determines whether the neutral switch 38 is turned on.

If YES, i.e., the engine falls in the other engine idling condition with the vehicle stopped and the transmission being in the neutral stage, the routine is ended.

If NO in the step S2, the routine goes to a step S3. In the step S3, the control unit 30 determines whether the engine is in the engine idling condition according to the output signal of the idle switch 34.

If NO in the step S2, the routine is ended.

If YES in the step S3, the control unit 30 determines that the engine is in the idling condition with no depression of the accelerator pedal and the routine goes to a step S4.

In the step S4, the control unit 30 determines whether the engine is abruptly decelerated due to an abrupt release of the acceleration pedal.

That is to say, the control unit 30 determines (YES) that the abrupt deceleration occurs when a reduction speed of the engine revolution number Δn within a predetermined period of time is larger than a set revolution speed N1 and determines (NO) when it is below N1.

If YES in the step S4, the routine goes to a step S5. If NO, the routine is ended.

In the step S5, the control unit 30 controls a duty ratio of the pulse signal supplied to the AAC/V 44 so as to provide a maximum opening time, thus providing a maximum quantity of auxiliary intake air for each engine combustion chamber.

In the next step S6, the control unit 30 determines whether the air conditioner switch 40 is turned on. If turned off, the routine goes to a step S8.

If the air conditioner switch 40 is turned on, the routine goes to a step S7 in which the control unit 30 is forcefully turned off so that a drive load applied to the engine 11 is reduced so as to prevent a slow rise in the engine revolution speed.

In the step S8, the control unit 30 determines whether the fuel injection through the fuel injection valve 42 is halted.

If not halted, the routine goes to a step S10.

If halted, the routine goes to a step S9 in which a release (or interuption) of halting the fuel injection is carried out.

In more detail, although the fuel injection is cut off normally during the engine idling, the fuel cutoff control is temporarily halted in order to carry out a, so-called, idle up control.

In the step S10, the control unit 30 outputs the ignition timing control signal to the distributor 35 so that the air/fuel mixture supplied to each combustion chamber is ignited and burned at an advanced ignition timing, thus preventing the misfire of the leaned air/fuel mixture.

In a step S11, the control unit 30 outputs the wider pulsewidth to the fuel injection valve as an asynchronous (interruption) fuel injection.

The interruption fuel injection is carried out at least once. According to the engine driving condition, the fuel injection may interruptedly be carried out once or more. Consequently, the engine revolution speed above about 1,500 r.p.m. can be secured. Then, the revolution speed of the oil pump 21 is instantenously increased due to the driving force transmitted from the crankshaft 12a so as to secure the drained pressure sufficiently and the gear ratio can speedily be changed from the second or third speed range to the first speed range.

Hence, in a case where the immediate acceleration occurs after the abrupt deceleration, a time lag is prevented due to the shift in the first speed range and a real time acceleration becomes possible. Consequently, the driver's feeling of acceleration can sufficiently be satisfied.

In addition, a sufficient tension of the steel belt between both pulleys 16, 17 can be acheived with prevention of slip thereof and the durability of the steel belt 19 can be improved.

The above-described control procedure is called the idle up control.

Upon completion of the interruption injection control in the step S11, the routine returns to the step S1. It is noted that in a case where the drive depresses the accelerator pedal to carry out the engine acceleration during the idle up control procedure, the control such that the normal acceleration asynchronous injection is halted and the idle up control is carried out with a higher priority. Furthermore, although the fuel injection timing is instantenously carried out at a time when the idle up control condition is established. If no corresponding cylinder to which the fuel injection is carried out is present at the time of establishment of the idle up control condition, the interuption fuel injection is carried out for one of the cylinders to which the last fuel injection is carried out immdediately before the determination of the idle up control condition.

Figure 4:
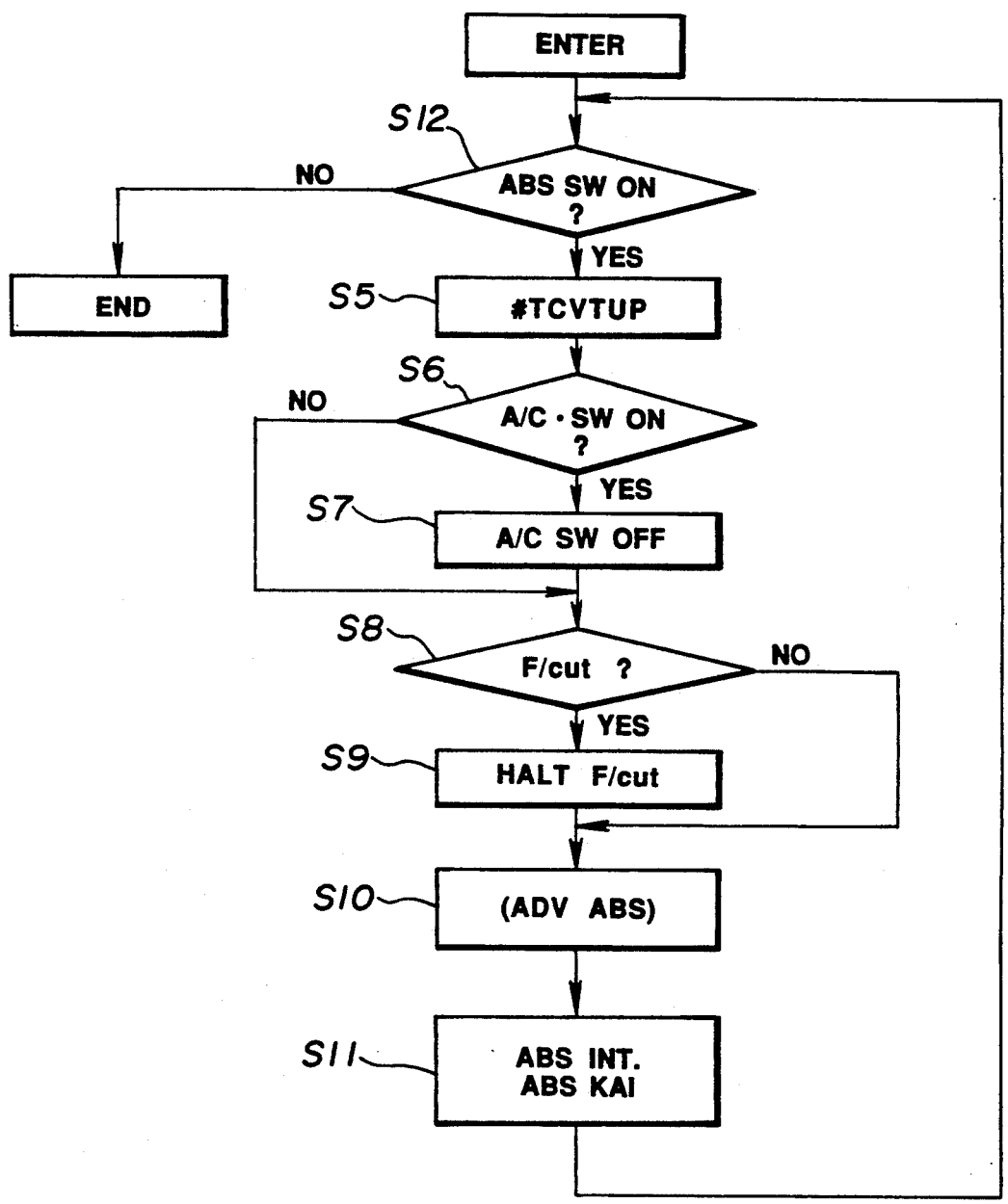
FIG. 4 is a control flowchart of an idle up control executed by the control unit in the engine idling speed controlling system applicable to an automotive vehicle in which an anti-skid brake control system is mounted.

FIG. 4 shows a control flowchart of the idle up control procedure executed by the control unit 30 when the engine idling system acording to the present invention is applied to the vehicle in which the anti-lock brake mechanism is installed.

It is noted that when the anti-lock mechanism is turned on, the electromagnetic clutch mechanism is disengaged from the engine in order to reduce the load applied to the engine.

FIG. 4, the engine revolution speed is in the normal engine idling speed.

When the anti-lock brake mechanism is turned off, the steel belt of the ECVT slips since a force to rotate the associated tires wheels is large. To prevent such slip phenomenon, the engine revolution speed is increased so as to increase the drained pressure of the oil pump and to increase the belt tension.

As shown in FIG. 4, a step S12 is a replaced step of the step S4 in FIG. 3. In the step S12, the control unit 30 determines whether the anti-lock brake control mechanism switch 50 is turned on.

If it is turned on, the control unit 30 determines that the engine is abruptly decelerated and the routine goes to the step S5 in the same way as in the case of FIG. 3.

The same processing is executed after the step S5 of FIG. 4. However, the same number of interruption fuel injections as that of the operations of the anti-lock brake control mechanism are carried out.

As described hereinabove, in the engine idling speed controlling system and method according to the present invention, the fuel is asynchronously injected toward the respective combustion chambers or is increased with the fuel incremental correction coefficient so that the engine revolution speed during the engine idling is temporarily incrased. Therefore, since the oil pump revolution speed of the belt type electro-continusly variable transmission can accordingly be increased and a sufficient amount of drained hydraulic pressure can be assured. Then, the change of the gear ratio to the first speed range can speedily be carried out even during the abrupt deceleration. Furthermore, the time lag can be prevented in the case where the immediate acceleration occurs after the abrupt deceleration and, thereby, the real time acceleration can be achieved. The driver's feeling of acceleration can sufficiently be satisfied.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A system for controlling engine idling speed for an internal combustion engine associated with a belt type electro-continuously variable transmission, comprising:
   a) first means for detecting an engine idling state of the engine and outputting an engine idling state indicative signal;
   b) second means for detecting an engine revolution speed and outputting an engine revolution speed indicative signal according to the detected engine revolution speed;
   c) third means for comparing the engine revolution speed with a predetermined engine revolution speed so as to derive a rate of engine revolution speed reduction and output the rate of the engine revolution speed reduction indicative signal according to the result of comparison;
   d) fourth means for determining an abrupt deceleration of the engine when the engine falls in the engine idling state on the basis of the engine idling state indicative signal and the rate of engine revolution speed reduction indicative signal; and
   e) fifth means for exceptionally supplying an amount of fuel into respective engine combustion chambers when the fourth means determines the abrupt deceleration of the engine.

2. A system for controlling engine idling speed for an internal combustion engine associated with a belt type electro-continuously variable transmission as set forth in claim 1, wherein the electro-continuously variable transmission is provided with an oil pump whose revolution speed is increased temporarily when the fifth means exceptionally supplies the amount of fuel into the respective combustion chambers so that the engine revolution speed is temporarily increased.

3. A system for controlling engine idling speed for an internal combustion engine associated with a belt type electro-continuously variable transmission as set forth in claim 2, wherein said first means includes a nuetral switch which is turned off when the transmission is placed at a shift range position except a neutral shift range and an engine ilding switch installed on an engine throttle valve which is turned on when the engine throttle valve is in a fully closed position.

4. A system for controlling engine idling speed for an internal combustion engine associated with a belt type electro-continuously variable transmission as set forth in claim 3, which further includes an idle control valve, installed in a bypass passage of intake air passage linked to the respective combustion chambers, for controlling an auxiliary air quantity sucked into the respective combustion chambers according to a duty ratio of its input signal, said idle control valve being controlled to provide a maximum auxiliary intake air quantity when the neutral switch is turned off and idle switch is tunred on.

5. A system for controlling engine idling speed for an internal combustion engine associated with a belt type electro-continuously variable transmission as set forth in claim 4, which further includes an air conditioner switch installed on a vehicular air conditioner which is turned on to supply power to the air conditioner and wherein when the neutral switch is turned off and the idle switch is turned on, sixth means for turning off the air conditioner is operated.

6. A system for controlling engine idling speed for an internal combustion engine associated with a belt type electro-continuously variable transmission as set forth in claim 5, which further includes seventh means for advancing an ignition timing for each ignition plug installed in each combustion chamber when the abupt deceleration of the engine during the engine idling occurs.

7. A system for controlling engine idling speed for an internal combustion engine associated with a belt type electro-continuously variable transmission as set forth in claim 6, which further includes a fuel injection valve installed in the intake air passage and wherein said fifth means carries out an asynchronous fuel injection via the fuel injection valve so that the engine idling speed is above about 1,500 r.p.m.

8. A system for controlling engine idling speed for an internal combustion engine associated with a belt type electro-continuously variable transmission as set forth in claim 7, wherein the asynchronous fuel injection is immediately carried out for one of the combustion chambers when the abrupt deceleration during the engine idling is determined.

9. A system for controlling engine idling speed for an internal combustion engine associated with a belt type electro-continuously variable transmission as set forth in claim 7, which further includes sixth means for determining whether an anti-lock brake system intalled on the vehicle is operated and wherein said fifth means carries out a plurality of asynchronous fuel injections whose number of times are the same as those operations of the anti-lock brake system.

10. A method for controlling engine idling speed for an internal combustion engine associated with a belt type electro-continuously variable transmission comprising the steps of:

a) detecting an engine idling state of the engine and outputting an engine idling state indicative signal;
b) detecting an engine revolution speed and outputting an engine revolution speed indicative signal according to the detected engine revolution speed;
c) comparing the engine revolution speed with a predetermined engine revolution speed so as to derive a rate of engine revolution speed reduction and output the rate of the engine revolution speed reduction indicative signal according to the result of comparison;
d) determining an abrupt deceleration of the engine when the engine falls in the engine idling state on the basis of the engine idling state indicative signal and the rate of engine revolution speed reduction indicative signal; and
e) exceptionally supplying an amount of fuel into respective engine combustion chambers when determining the abrupt deceleration of the engine.

* * * * *